US007945370B2

(12) United States Patent
Manan et al.

(10) Patent No.: US 7,945,370 B2
(45) Date of Patent: May 17, 2011

(54) CONFIGURING AN ENGINE CONTROL MODULE

(75) Inventors: Adnan A. Manan, Dunlap, IL (US); Mark R. Bartlett, Houston, TX (US)

(73) Assignee: Caterpillar Inc., Peoria, IL (US)

( * ) Notice: Subject to any disclaimer, the term of this patent is extended or adjusted under 35 U.S.C. 154(b) by 696 days.

(21) Appl. No.: 12/068,510

(22) Filed: Feb. 7, 2008

(65) Prior Publication Data

US 2009/0204308 A1 Aug. 13, 2009

(51) Int. Cl.
*G06F 17/00* (2006.01)
*G01M 15/04* (2006.01)

(52) U.S. Cl. ........................................ 701/102; 701/115

(58) Field of Classification Search .................. 701/102, 701/101, 110, 115
See application file for complete search history.

(56) References Cited

U.S. PATENT DOCUMENTS

| | | | |
|---|---|---|---|
| 3,367,110 A | 2/1968 | Leeson, Jr. | |
| 4,098,242 A | 7/1978 | Anderson | |
| 4,740,898 A | 4/1988 | McKee et al. | |
| 4,915,072 A | 4/1990 | Caron et al. | |
| 5,231,344 A | 7/1993 | Marumoto et al. | |
| 5,265,644 A | 11/1993 | Tuckey | |
| 5,394,851 A | 3/1995 | Cryer et al. | |
| 5,749,344 A | 5/1998 | Yoshiume et al. | |
| 5,771,861 A | 6/1998 | Musser et al. | |
| 5,886,422 A | 3/1999 | Mills | |
| 6,031,749 A | 2/2000 | Covington et al. | |
| 6,133,643 A * | 10/2000 | Lukich et al. | 290/40 A |
| 6,194,792 B1 | 2/2001 | Yanou et al. | |
| 6,240,902 B1 | 6/2001 | Tanaka et al. | |
| 6,279,541 B1 | 8/2001 | Doane et al. | |
| 6,330,873 B1 | 12/2001 | Letang et al. | |
| 6,334,085 B1 * | 12/2001 | Kawamura et al. | 701/115 |
| 6,456,908 B1 | 9/2002 | Kumar | |
| 6,465,908 B1 | 10/2002 | Karuppana et al. | |
| 6,507,505 B2 | 1/2003 | Oka et al. | |
| 6,532,941 B2 | 3/2003 | Begley et al. | |
| 6,609,501 B2 | 8/2003 | Doane et al. | |
| 6,622,707 B2 | 9/2003 | Begley et al. | |
| 6,665,601 B1 * | 12/2003 | Nielsen | 701/50 |
| 6,775,163 B2 | 8/2004 | McDonald et al. | |
| 6,807,949 B2 | 10/2004 | Kishibata et al. | |
| 6,809,678 B2 | 10/2004 | Vera et al. | |
| 6,819,012 B1 | 11/2004 | Gabrys | |
| 6,877,488 B2 | 4/2005 | Washeleski et al. | |
| 6,885,166 B2 | 4/2005 | Eisenhardt et al. | |
| 6,903,537 B2 | 6/2005 | Tzeng et al. | |
| 6,979,916 B2 | 12/2005 | Schienbein et al. | |
| 7,023,672 B2 | 4/2006 | Goodfellow et al. | |
| 2005/0284448 A1 | 12/2005 | Forgue et al. | |
| 2007/0084444 A1 | 4/2007 | Bellistri et al. | |
| 2007/0137620 A1 | 6/2007 | Couch | |

OTHER PUBLICATIONS

Product Specification No. 03258E for SG 2D, Woodward Governor Company, (4 pages).

* cited by examiner

*Primary Examiner* — Hieu T Vo

(57) ABSTRACT

Method and systems are provided for configuring operations of an engine control module. In one implementation, a method is provided. According to the method, configuration parameters defining an operational range of an engine are received. Furthermore, data specifying performance requirements of the engine is received from the engine control module. The method determines whether the configuration parameters meet the performance requirements.

19 Claims, 4 Drawing Sheets

CONFIGURING AN ENGINE CONTROL MODULE

TECHNICAL FIELD

The present disclosure relates generally to computerized methods and systems, and more particularly, to computer-implemented methods and systems for configuring operations of an engine control module.

BACKGROUND

A modern machine (e.g., a fixed and mobile commercial machine, such as a construction machine, fixed engine system, marine-based machine, etc.) typically includes a variety of systems for performing machine operations and for controlling the machine. For example, the machine may include an electronic control unit (ECU), which may control one or more subsystems of the machine.

One type of ECU is an engine control module (ECM), which may control operations of the machine's engine. The ECM may control, for example, the quantity of fuel that is injected into each cylinder per engine cycle, ignition timing, variable valve timing, and operations of other engine components. Furthermore, an ECM may receive instructions specifying performance parameters and/or performance limits of the engine from a machine component called a governor.

In operation, the governor may specify to the ECM limits and/or performance requirements of the engine. The ECM will then, in turn, enforce these limits and requirements during engine operation. For example, the governor may regulate rotational speed of the engine and/or the speed of the machine. Accordingly, the governor might protect the engine from damage due to excessive rotational speed or operating the engine past its recommended performance limits. Moreover, using a governor to limit the machine's speed may help to reduce the risk of damaging the machine or machine components (e.g., excessive tire wear) and/or may avoid causing components to fail entirely.

As established from the foregoing, the governor may regular the performance of an engine to predetermined requirements. However, a user may wish to change the performance parameters set by the governor in order to adjust the machine's operations to desired requirements. These changes may still be within an acceptable range established by the governor. For example, the user may wish to specify settings such as the duty cycle (i.e., the ratio of run time to total cycle time) or the minimum and maximum amount of fuel that is injected per cycle. However, the user may not easily configure the ECM without updating the ECM code and, in many situations, ECM code is written specifically for each engine.

U.S. Pat. No. 6,240,902 B1 (the '902 patent) to Tanaka et al. discloses a drive unit for driving a fuel pump of a vehicle. According to the '902 patent, an ECU controls a fuel injection amount and drives the fuel pump on the basis of control data. However, the '902 patent does not disclose a method or system that allows a user to configure operations of an ECM. Furthermore, the '902 patent does not disclose a method or system that allows the user to configure operations regardless of the engine governor that is being used by the machine to control the engine's performance.

Disclosed embodiments are directed to overcoming one or more of the problems set forth above.

SUMMARY

In one aspect, the present disclosure is directed to a method for configuring operations of an engine control module. The method may receive configuration parameters defining an operational range of an engine. The method may further receive, from the engine control module, data specifying performance requirements of the engine. The method may determine whether the configuration parameters meet the performance requirements.

In another aspect, the present disclosure is directed to a system for configuring operations of an engine control module. The system may comprise an engine control module and configuration hardware. The engine control module may provide data specifying performance requirements of an engine. The configuration hardware may receive the data specifying performance requirements and configuration parameters from a user. The configuration parameters may define an operational range of the engine. Furthermore, the configuration hardware may determine whether the configuration parameters meet the performance requirements.

BRIEF DESCRIPTION OF THE DRAWINGS

The accompanying drawings, which are incorporated in and constitute a part of this disclosure, illustrate various embodiments. In the drawings.

DETAILED DESCRIPTION

Reference will now be made in detail to the following exemplary embodiments, which are illustrated in the accompanying drawings. Wherever possible, the same reference numbers will be used throughout the drawings to refer to the same or like parts.

Figure 1A:
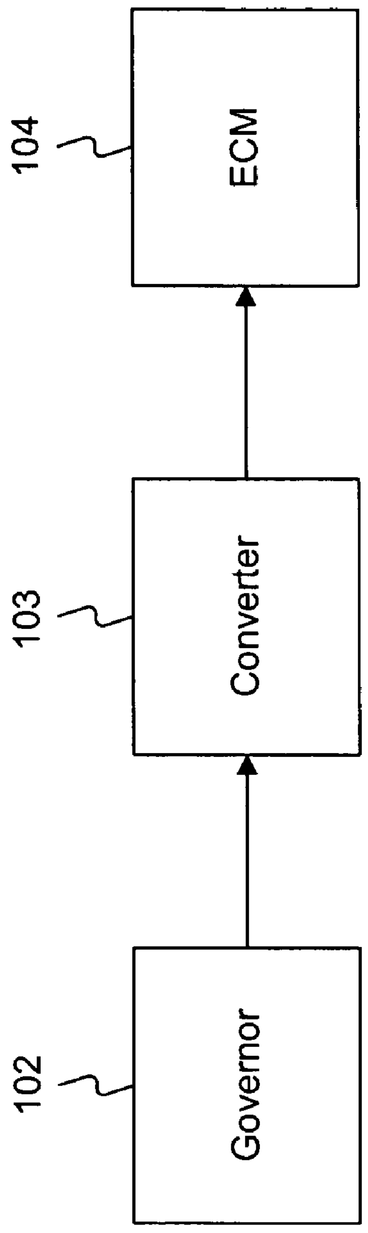
FIG. 1A shows an exemplary configuration of a governor, converter, and engine control module.

FIG. 1A shows an exemplary configuration of a governor 102, a converter 103, and an ECM 104. Governor 102 may measure and regulate rotational speed of an engine (not shown) and/or the speed of a machine. For example, governor 102 might protect the engine from damage due to excessive rotational speed, or operating the engine past its recommended limits. Furthermore, governor 102 may be external to the machine's engine and output a control signal to ECM 104.

In the example shown in FIG. 1A, governor 102 may output a current signal. However, ECM 104 may require a pulse-width modulation (PWM) signal. PWM of a signal involves the modulation of its duty cycle, to convey information over a communications channel or control the amount of power sent to a load and uses a square wave having a duty cycle that is modulated resulting in variation of the average value of the waveform. Thus, in the example of FIG. 1A, in order to provide the proper control signal to ECM 104, converter 103 may convert the current signal that is output from governor 102 to a PWM signal. Converter 103 may accomplish this conversion by using an appropriate conversion algorithm. Conversion of the output signal, as discussed above, may be necessary in a situation where the engine is provided by one vendor and governor 102 is provided by a different vendor.

Figure 1B:
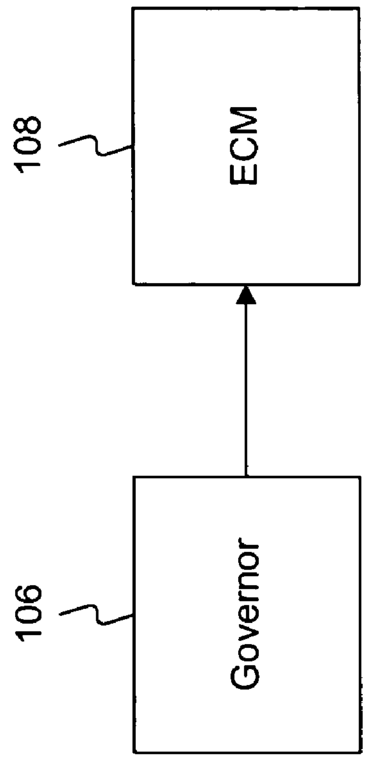
FIG. 1B shows an exemplary configuration of a governor and an engine control module.

FIG. 1B shows an exemplary configuration of a governor 106 and an ECM 108. In operation, governor 106 may provide similar functionality as governor 102. Furthermore, ECM 108 may be configured to receive a PWM signal However, in contrast to the example shown FIG. 1A, in this implementation, governor 106 may output a PWM signal. Thus, in the example of FIG. 1B, a converter (e.g., converter 103) is not needed because ECM 108 may directly receive the PWM signal that is output from governor 106.

As outlined above regarding FIGS. 1A and 1B, an ECM may receive a control signal from a governor that is a PWM signal. The ECM may receive the PWM signal directly from the governor or may receive the PWM signal from a converter. In either instance, the ECM receives a PWM signal, which provides parameters to the ECM specifying limits and/or performance requirements of the engine. The ECM will then, in turn, enforce these limits and requirements during the engine's operations. Implementations describe below may make use of either configuration and, additionally, provide user configuration of ECM operations, as discussed below in further detail.

Figure 2:
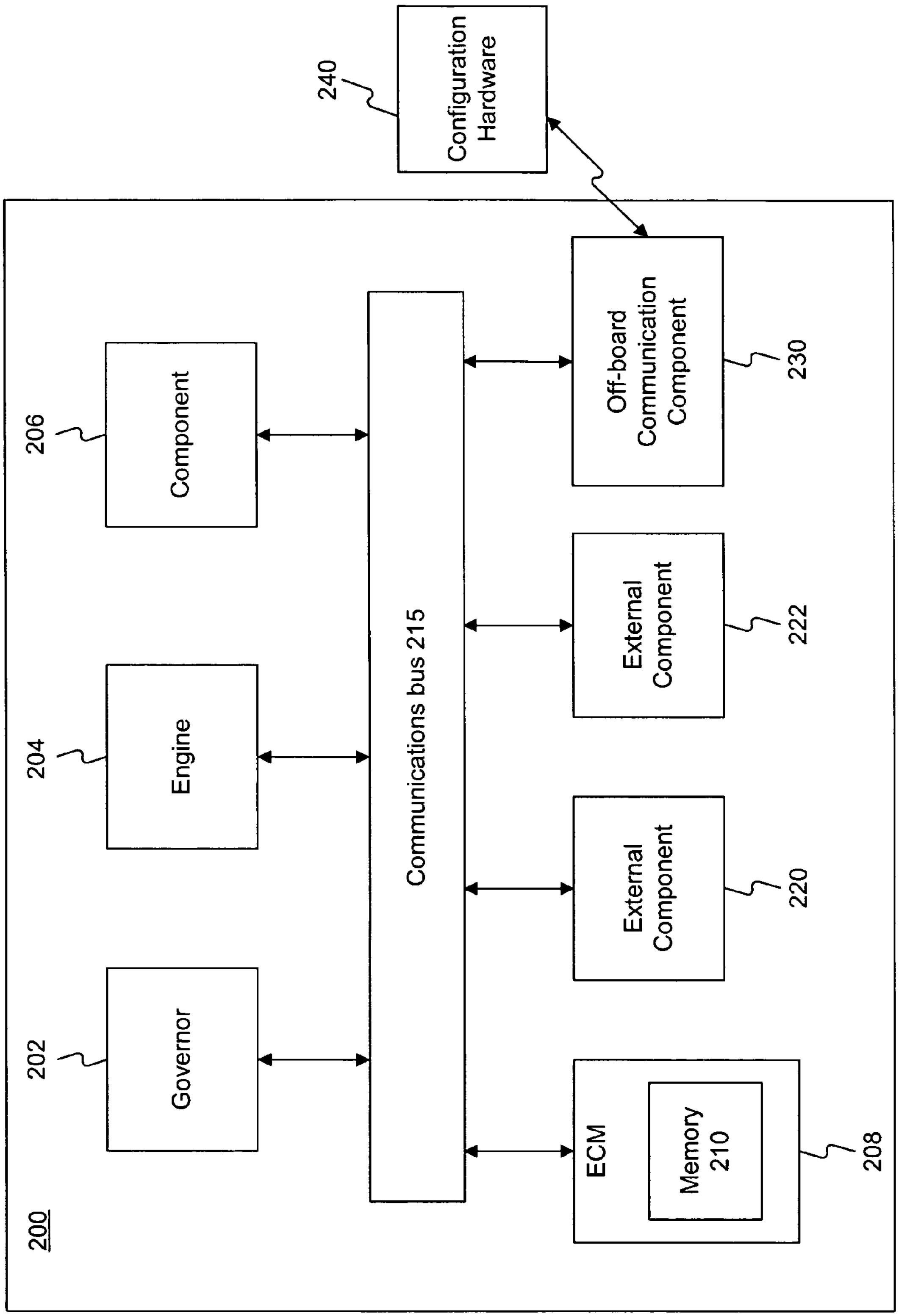
FIG. 2 is an exemplary system for providing user configuration of engine control module operations through software functions, consistent with a disclosed embodiment.

FIG. 2 is an exemplary system 200 for providing user configuration of ECM operations through software functions, consistent with a disclosed embodiment. System 200 may represent a combination of software and hardware components included in a machine (not shown). As used herein, the term "machine" refers to a fixed or mobile machine that performs some type of operation associated with a particular industry, such as mining, construction, farming, etc., and operates between or within environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving machines, mining machines, backhoes, material handling equipment, farming equipment, marine vessels, aircraft, and any type of movable machine that operates in an environment.

System 200 may include a governor 202, an engine 204, engine component 206, engine control module (ECM) 208, external components 220-222, off-board communication component 230, and configuration hardware 240. ECM 208 may communicate with governor 202, engine component 206, external components 220-222, or off-board communications component 240 via communications bus 215. Although FIG. 2 depicts one engine component 206, two external components 220-222, and one off-board communications component 230, one of ordinary skill in the art will appreciate that the number of components shown in FIG. 2 is illustrative and additional components may be included in system 200.

Engine 204 may be any appropriate type of engine for operating a machine. For example, engine 204 may be a diesel, gasoline, or natural gas driven internal combustion engine. Disclosed embodiments may be implemented consistent with large engine platforms, such as models 3500, G3500, C175, CG175, 3600, and C280, for example, provided by Caterpillar Inc. Furthermore, engine 204 may use fuels such as ethanol, methanol, or other distilled alcohols. Alternatively, engine 204 may be an electrical generation power engine using any of a variety of fuels.

ECM 208 may communicate with governor 202, engine component 204, and external components 220-222 via communications bus 215. ECM 208 may also receive data from and transmit data to off-board systems using off-board communications component 230, which is available over communications bus 215. Communications bus 215 may be proprietary or non-proprietary, and may include manufacturer-based data links and communication paths based on known industry standards (e.g., J1939, RS232, RP 1210, RS-422, RS-485, MODBUS, CAN, etc.).

ECM 208 may include one or more hardware and/or software components for controlling and/or monitoring operations of engine 240. For example, ECM 208 may include a processor (not shown) and a memory 210 storing software for regulating and/or controlling engine operations. In operation, ECM 208 manages or controls an operating state of engine 204, including controlling starting and shutdown sequences for starting and shutting down motors. To facilitate a central approach to engine state information, ECM 208 may determine a state of the engine, which may be stored by ECM 208 (e.g., in memory 210).

ECM 208 may communicate with governor 202 via communications bus 215 to determine operating parameters of engine 204. Governor 202 may comprise any combination of hardware, sensors, controllers, and/or software. Governor 202 may regulate rotational speed of engine 204 and/or the speed of the machine. To do so, governor 202 may provide a PWM signal (directly or indirectly via a converter), as discussed above in connection with FIGS. 1A and 1B. The PWM signal may provide parameters to ECM 208 specifying limits and/or performance requirements of engine 204. ECM 208 may enforce the limits and/or performance requirements during operations of engine 204.

Furthermore, ECU 208 may communicate with other components, such as component 206. Component 206 may comprise any combination of hardware, sensors, controllers, and/or software. For example, component 206 may include a temperature control software module for determining and regulating engine temperature and/or may include an oil pressure control software module for determining and regulating oil pressure. Component 206 may provide control information to ECU 208 via communications bus 215. Thus, ECU 208 may take into consideration control information from a variety of components and, based on the control information, regulate operations of engine 204.

External components 220-222 may control operations of a machine attachment, such as a blade. ECU 208 may communicate with one or more external components 220-222 and may comprise any combination of hardware, sensors controllers, and/or software modules. For example, external components 22-222 may be systems that require engine state information, but are not directly related to engine operations (e.g., other on-board machine systems, such as systems for controlling machine attachments or operator display systems, for example).

ECM 208 may communicate with off-board systems using off-board communications component 230. Transmission to off-board systems may be accomplished wirelessly over an antenna (not shown), for example. Wireless communication may include satellite, cellular, infrared, and any other type of wireless communication. Alternatively, off-board communications component 230 may directly interface with an off-board system through a data port (not shown), such as an Ethernet port. For example, an Ethernet port may receive data from, or deliver data to, an external device (not shown) that is connected to the data port. Communication between the external device and off-board communication component 230 may occur over one of many different networks (e.g., cellular, satellite, 802.11, etc.).

Configuration hardware 240 is external to system 200 and provides a mechanism for configuring operations of ECM 208. Configuration hardware 250 may constitute any device for configuring operations of ECM 208 and may implement routines through a combination of hardware and software. Furthermore, configuration hardware 240, in some embodiments, may be in communication with an external server (not shown) via a wireless or wired data link to a network (not shown). Accordingly, in such embodiments, configuration of ECM 208 may be accomplished remotely.

Configuration hardware 240 may comprise an input device (keypad, touch screen, voice recognition functionality) to authenticate a user that is attempting to configure operations of ECM 208. Furthermore, configuration hardware 240 may be omitted in embodiments wherein code is received directly via off-board communication component 230 via, for example, an antenna. Accordingly, in such implementations, processes performed by configuration hardware 240 may be performed by off-board communication component 230.

In disclosed implementations, governor 202 may provide control parameters to ECM 208. ECM 208 may use the parameters provided by governor 202 when determining performance parameters and/or limits of the engine. Furthermore, operational parameters of engine 204 may be provided by code stored in memory 210, which may not be modified by users. For example, to change the operational parameters, the user may need to obtain new code from the manufacturer that is written specifically for the particular engine and flashed onto memory 210 of ECM 208. In disclosed embodiments, user may instead update specific operational parameters without obtaining and flashing new code. For example, a user may wish to specify parameters such as the minimum and maximum duty cycle (i.e., the ratio of run time to total cycle time) or the minimum and maximum amount of fuel that is injected per cycle.

Using configuration hardware 240, the user may configure operations of ECM 208. A user interface tool generated by, for example, configuration hardware 240 and/or a remote configuration tool provided over a network (not shown) may allow the user to configure performance of engine 204 to user-defined settings, as discussed below in further detail. When a remote configuration tool is used, the tool may be operated from one or more terminals (not shown) connected to a network and executing, for example, a program generating a graphical user interface.

Terminals may be any type device for communicating over a network. For example, terminals may be personal computers, handheld devices, or any other appropriate computing platform or device capable of exchanging data with the network. Furthermore, the network may be a shared, public, or private network, may encompass a wide area or local area, and may be implemented through any suitable combination of wired and/or wireless communication networks. Furthermore, the network may comprise a local area network (LAN), a wide area network (WAN), an intranet, or the Internet.

Figure 3:
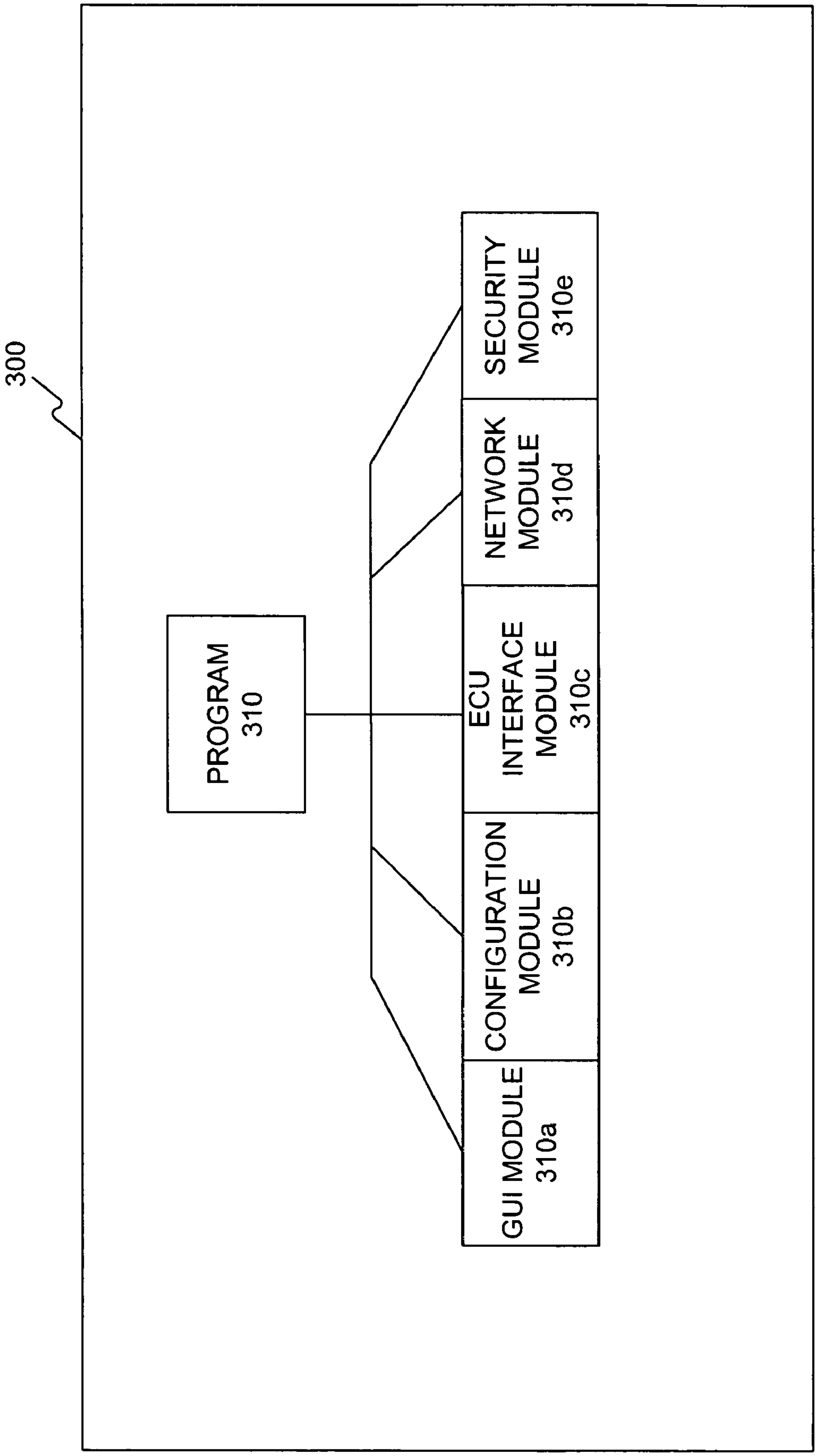
FIG. 3 shows an exemplary software architecture for configuring operations of an engine control module, consistent with a disclosed embodiment.

FIG. 3 shows an exemplary software architecture for configuring operations of ECU 208, consistent with a disclosed embodiment. The software architecture may be stored in memory 300, which may be included in configuration hardware 240 or a user terminal (not shown) available over a network in communication with off-board communication component 230, for example.

In one embodiment, memory 300 stores instructions of program 310, which when executed, perform a process that allows a user to configure ECU 208. To provide user configuration functionality, program 310 may include instructions in the form of one or more software modules 310*a*-310*e*. Software modules 310*a*-310*e* may be written using any known programming language, such as C++ XML, etc., and may include graphical user interface (GUI) module 310*a*, configuration module 310*b*, ECU interface module 310*c*, network module 310*d*, and security module 310*e*.

GUI module 310*a* may provide a user interface displayable on an input device (e.g., (keypad, touch screen, voice recognition functionality) included in and/or in communication with configuration hardware 240. Alternatively, GUI module 310*a* may provide a user interface displayable on a terminal in communication with off-board communication component 330 via a network. The user interface may provide the user with the ability to enter credentials (e.g., a username and password) for authentication purposes. Furthermore, the user interface may provide the user with the ability to configure operations of ECU 208 by inputting one or more configuration parameters.

Configuration module 310*b* may carry out configuration functions, such as determining whether configuration parameters provided by a user are appropriate for engine 204. For example, the user may provide configuration parameters changing the value of the minimum and maximum duty cycle (e.g., 13% minimum duty cycle and 75% maximum duty cycle). Furthermore, configuration module 310*b* may provide functionality for checking that the minimum value entered by the user is less than the maximum value entered by the user and, accordingly, constitutes a valid range. Furthermore, configuration module 310*b* may check the configuration parameters to ensure that the minimum and maximum values are within an operating range specified by governor 202.

For example, governor 202 may output a PWM signal specifying operating ranges of engine 204 (e.g., the PWM signal may specify a 10% to 80% duty cycle). Returning to the prior example where the user entered a 13% minimum duty cycle and 75% maximum duty cycle, configuration module 310*b* may determine whether the user values are within the requirements of governor 202.

ECU interface module 310*c* may format and provide information (e.g., configuration parameters) to ECU 208 via communications bus 215. Furthermore, ECU interface module 310*c* may receive information (e.g., performance requirements of governor 202) from ECU 208. For example, ECU interface module 310*c* may format and transmit messages from configuration hardware 240 to off-board communication component 230 for transmission via communications bus 215. Alternatively, ECU interface module 310*c* may format and transmit messages to off-board communication component 230 for transmission via communications bus 215.

Network module 310*d* may determine whether an appropriate network connection (e.g. cellular, satellite, 802.11, USB, serial, on-board data links, etc.) is available to transmit data. For example, in an implementation where configuration hardware 240 communicates wirelessly, network module 310*d* may check for an appropriate network port of off-board communication component 230. Alternatively, in an implementation where off-board communication component 230 receives data from a network, network module 310*d* may check for an appropriate network port of off-board communication component 230.

Security module 310*e* may execute a security process to determine whether appropriate security features are confirmed (e.g., data security, and other firewall types of processes) before transmitting data to off-board communication component 230 from a network or configuration hardware 240. For example, security module 310*e* may encrypt data and verify the security of a connection with off-board communication component 230 prior to data transmission.

Although program modules 310*a*-310*e* have been described above as being separate modules, one of ordinary skill in the art will recognize that functionalities provided by one or more modules may be combined. Furthermore, one of ordinary skill in the art will recognize that program 310 may reside in one or more of a variety of storage locations, such as in memory included in system 200, off-board communication component 240, and/or an external terminal in communication with off-board communication component 230 via a network.

Figure 4:
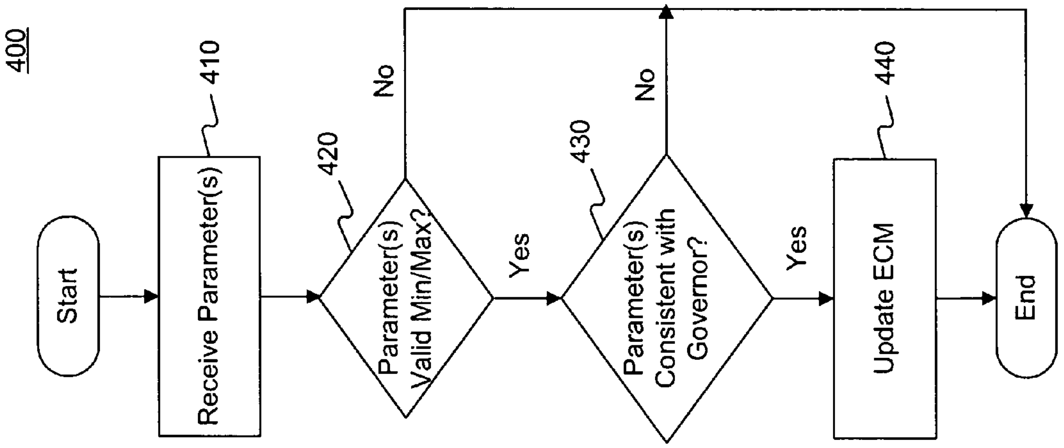
FIG. 4 is a flow diagram showing an example of a method for configuring operations of an engine control module, consistent with a disclosed embodiment.

Referring now to FIG. 4, a flow diagram 400 is provided of an example of a method for configuring operations of ECM 208, consistent with a disclosed embodiment. The method may implement processes according to program modules 310*a*-310*e*. For example, the method may configure parameters such as the minimum and maximum duty cycle (i.e., the ratio of run time to total cycle time) or the minimum and maximum amount of fuel that is injected per cycle.

At the start of the process, in step 410, off-board communication component 230 may receive one or more configuration parameters. Off-board communication component 230 may receive the one or more configuration parameters from configuration hardware 240 and/or directly from, for example, an antenna. Accordingly, a user may input the configuration parameters remotely or onsite by using configuration hardware 240. In either case, the user may input the configuration parameters via an interface, for example, such as a graphical user interface (GUI) that is generated by GUI module 310*a*. The GUI may prompt the user to enter the configuration parameters.

In step 420, the input values may be checked to ensure valid minimum and maximum values. For example, the user may provide configuration parameters changing the value of the minimum and maximum duty cycle (e.g., 13% minimum duty cycle and 75% maximum duty cycle). In step 420, configuration hardware 240 and/or off-board communication component 230 may check that the minimum value entered by the user is less than the maximum value entered by the user and, accordingly, constitutes a valid range. If the minimum and maximum values are not a valid range (e.g., the minimum value exceeds the maximum value), then the process may end or prompt the user to reenter the values.

Next, in step 430, the input values may be checked to ensure that the minimum and maximum values are within an operating range specified by governor 202. For example, governor 202 may output a PWM signal specifying operating ranges of engine 204 (e.g., the PWM signal may specify a 10% to 80% duty cycle). Returning to the prior example where the user entered a 13% minimum duty cycle and 75% maximum duty cycle, configuration hardware 240 and/or off-board communication component 230 may determined that the user values are within the requirements of governor 202. However, if the minimum and maximum values are not within the requirements of governor 202, then the process may end or prompt the user to reenter the values.

Configuration module 310*b*, discussed above, may execute routines for determining whether the configuration parameters are acceptable in steps 420 and 430. Furthermore, ECU interface module 310*c* may establish a data connection with ECU 208 in order to receive guidance as to operating requirements of engine 204.

In step 440, configuration hardware 240 may transmit the configuration parameters to off-board communication component 230, which may then transmit the configuration parameters via communications bus 215 to ECM 208. In an implementation where off-board communication component 230 directly receives the configuration parameters, off-board communication component 230 may directly transmit the configuration parameters to ECM 208. ECM 208 may then update the configuration parameters with the user values. For example, network module 310*d* may transmit the configuration parameters via network in some implementations. Furthermore, security module 310*e* may ensure that data transmission is secure throughout the process.

As one of ordinary skill in the art will appreciate, one or more of steps 410-440 may be optional and may be omitted from implementations in certain embodiments.

INDUSTRIAL APPLICABILITY

Disclosed embodiments may provide methods and systems for configuring engine control module (ECM) operations. In particular, disclosed embodiments may allow a user to configure settings in an ECM in order to adjust the machine's engine to specific performance requirements. For example, the user may wish to specify configuration parameters such as the duty cycle (i.e., the ratio of run time to total cycle time) or the minimum and maximum amount of fuel that is injected per cycle. By providing methods and systems for configuring an ECM, a user may adjust configuration parameters without the need for rewriting and updating ECM code. Furthermore, updates to ECM operations may take into consideration operating requirements of a governor, which may be provided by the same manufacturer as the engine or by a third party.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods may be implemented as a combination of hardware and software or in hardware alone. Examples of hardware include computing or processing systems, including personal computers, servers, laptops, mainframes, microprocessors and the like. Additionally, although aspects are described as being stored in memory, one skilled in the art will appreciate that these aspects can also be stored on other types of computer-readable media, such as secondary storage devices, for example, hard disks, floppy disks, or CD-ROM, the Internet or other propagation medium, other forms of RAM or ROM, USB media, DVD, or other optical drive media. Computer programs based on the written description and methods for implementing disclosed embodiments are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or browser software.

Moreover, while illustrative embodiments have been described herein, the disclosure includes any and all embodiments having equivalent elements, modifications, omissions, combinations (e.g., of aspects across various embodiments), adaptations and/or alterations as would be appreciated by those in the art based on the present disclosure. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A system for configuring operations of an engine control module, comprising:

an engine control module providing data specifying performance requirements of an engine; and configuration hardware, the configuration hardware receiving the data specifying performance requirements and configuration parameters from a user, the configuration parameters defining an operational range of the engine, wherein the configuration hardware further determines whether the configuration parameters meet the performance requirements.

2. The system of claim 1, wherein the performance requirements received from the engine control module include requirements of a governor, the governor being in communication with the engine control module and specifying at least one of a maximum rotational speed of the engine and a maximum speed of a machine.

3. The system of claim 1, wherein the operational range specified by the configuration parameters comprises a minimum and a maximum operational range of the engine.

4. The system of claim 3, wherein the minimum value and the maximum value are duty cycle percentages.

5. The system of claim 1, wherein the configuration hardware transmits the configuration parameters to the engine control module when the configuration parameters meet the performance requirements.

6. A method for configuring operations of an engine control module, comprising:

receiving configuration parameters, the configuration parameters defining an operational range of an engine;

receiving, from the engine control module, data specifying performance requirements of the engine; and determining whether the configuration parameters meet the performance requirements.

7. The method of claim 1, wherein the configuration parameters are received from configuration hardware in communication with a machine comprising the engine.

8. The method of claim 1, wherein the configuration parameters are received by an off-board communication component of a machine comprising the engine.

9. The method of claim 1, wherein the performance requirements received from the engine control module include requirements of a governor, the governor in communication with the engine control module and specifying at least one of a maximum rotational speed of the engine and a maximum speed of a machine.

10. The method of claim 1, wherein the operational range specified by the configuration parameters comprises a minimum value and a maximum value of an operational range of the engine.

11. The method of claim 10, wherein the minimum value and the maximum value are duty cycle percentages.

12. The method of claim 10, wherein the minimum value and the maximum value are fuel injection amounts.

13. The method of claim 1, further comprising:

transmitting the configuration parameters to the engine control module when the configuration parameters meet the performance requirements.

14. The method of claim 13, wherein the configuration parameters are transmitted from configuration hardware in communication with a machine, the machine comprising the engine.

15. A computer-readable storage medium tangibly storing program instructions for configuring operations of an engine control module according to a method, the method comprising:

receiving configuration parameters, the configuration parameters defining an operational range of an engine;

receiving, from the engine control module, data specifying performance requirements of the engine; and determining whether the configuration parameters meet the performance requirements.

16. The computer-readable storage medium of claim 15, wherein the configuration parameters are received from configuration hardware in communication with a machine comprising the engine.

17. The computer-readable storage medium of claim 15, wherein the configuration parameters are received by an off-board communication component of a machine comprising the engine.

18. The computer-readable storage medium of claim 15, wherein the performance requirements received from the engine control module include requirements of a governor, the governor in communication with the engine control module and specifying at least one of a maximum rotational speed of the engine and a maximum speed of a machine.

19. The computer-readable storage medium of claim 15, the method further comprising:

transmitting the configuration parameters to the engine control module when the configuration parameters meet the performance requirements.

* * * * *